United States Patent [19]

Weisman, II et al.

[11] Patent Number: 5,987,888
[45] Date of Patent: *Nov. 23, 1999

[54] SYSTEM AND METHOD FOR CONTROLLING A TURBOCHARGER

[75] Inventors: S. Miller Weisman, II, Farmington Hills; Michael Wayne Trumbower, Milan; Richard Michael Avery, Jr., West Bloomfield; Dennis Michael Letang, Canton, all of Mich.

[73] Assignee: Detroit Diesel Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,818

[22] Filed: Jul. 15, 1997

[51] Int. Cl.$^6$ ..................................................... F02D 23/02
[52] U.S. Cl. ............................. 60/612; 60/605.1; 123/436
[58] Field of Search ........................... 60/600–603, 605.1, 60/612; 123/436

[56] References Cited

U.S. PATENT DOCUMENTS

| | | |
|---|---|---|
| 4,075,849 | 2/1978 | Richardson . |
| 4,203,296 | 5/1980 | Tanaka et al. . |
| 4,292,806 | 10/1981 | Moore et al. . |
| 4,397,285 | 8/1983 | O'Neill . |
| 4,428,199 | 1/1984 | Moore et al. . |
| 4,442,672 | 4/1984 | Fischer . |
| 4,467,607 | 8/1984 | Rydquist et al. . |
| 4,489,557 | 12/1984 | Fawcett et al. . |
| 4,671,068 | 6/1987 | Moody et al. . |
| 4,679,398 | 7/1987 | Noguchi et al. . |
| 4,680,933 | 7/1987 | Bozung et al. . |
| 4,697,421 | 10/1987 | Otobe et al. . |
| 4,741,163 | 5/1988 | Hidaka et al. . |
| 4,745,755 | 5/1988 | Kawamura . |
| 4,779,423 | 10/1988 | Szczupak . |
| 4,848,086 | 7/1989 | Inoue . |
| 4,953,110 | 8/1990 | Chartrand . |
| 5,069,194 | 12/1991 | Deutschmann et al. . |
| 5,123,246 | 6/1992 | Younessi et al. . |

(List continued on next page.)

FOREIGN PATENT DOCUMENTS

| | | |
|---|---|---|
| 30 05 108 | 8/1981 | European Pat. Off. . |
| WO/9745633 | 12/1997 | WIPO . |

OTHER PUBLICATIONS

R. Schulmeister, et al., Advanced Diesel Engines With Integrated Electronic Systems, ImechE, 1991, C430/012, Germany.

SAE Technical Paper Series, 951201, "Electronic Engine Management on an MTU 396 Heavy Duty Truck Engine", Steffan Spindler, SAE Library, 1995.

SAE Technical Paper Series, "Electronic Control of a Variable Geometry Turbocharger", Dilip Jain, May 3, 1990, SAE Library.

SAE Technical Paper Series, "Schwitzer Variable Geometry Turbo and Microprocessor Control Design and Evaluation", Steve Arnold, Feb. 16, 1987, SAE Library.

Dilip Jain, Electronic Control of a Variable Geometry Turbocharger, SAE Technical Paper Series 900889.

Steve Arnold, Schwitzer Variable Geometry Turbo and Microprocessor Control Design and Evaluation, SAE Technical Paper Series 870296.

*Primary Examiner*—Michael Koczo
*Attorney, Agent, or Firm*—Brooks & Kushman P.C.

[57] ABSTRACT

A method of controlling a turbocharger in an internal combustion engine includes monitoring a turbocharger parameter such as turbine speed or turbo boost pressure, and establishing a turbocharger parameter limit value for the turbocharger parameter. A dynamic engine torque limit value is determined based on the current value of the turbocharger parameter and the turbocharger parameter limit value. A provisional engine torque is based on engine conditions, and an applied or desired engine torque is limited to the lesser of the dynamic engine torque limit value and the provisional engine torque.

20 Claims, 4 Drawing Sheets

U.S. PATENT DOCUMENTS

| | | | |
|---|---|---|---|
| 5,148,364 | 9/1992 | Scherer . | |
| 5,186,081 | 2/1993 | Richardson | 60/600 |
| 5,231,830 | 8/1993 | Entemann et al. . | |
| 5,261,236 | 11/1993 | Ironside et al. . | |
| 5,445,128 | 8/1995 | Letang et al. | 123/436 |
| 5,477,827 | 12/1995 | Weisman et al. | 123/436 |
| 5,622,053 | 4/1997 | Freen | 60/603 |
| 5,709,192 | 1/1998 | Zimmermann . | |
| 5,769,052 | 6/1998 | Oestreicher et al. . | |
| 5,771,867 | 6/1998 | Amstutz et al. . | |
| 5,791,145 | 8/1998 | Freen | 60/603 |

SYSTEM AND METHOD FOR CONTROLLING A TURBOCHARGER

TECHNICAL FIELD

The present invention relates to systems and methods for controlling a turbocharger in an internal combustion engine.

BACKGROUND ART

In the control of internal combustion engines, the conventional practice utilizes electronic control units having volatile and non-volatile memory, input and output driver circuitry, and a processor capable of executing a stored instruction set, to control the various functions of the engine and its associated systems. A particular electronic control unit communicates with numerous sensors, actuators, and other electronic control units to control various functions, which may include various aspects of fuel delivery, transmission control, turbocharger control, or many others.

A turbocharger consists of a turbine and a compressor. The pressure of the engine exhaust gases causes the turbine to spin. The turbine drives the compressor, which is typically mounted on the same shaft. The spinning compressor creates turbo boost pressure which develops increased power during combustion. A wastegate at the turbine intake limits the amount of boost pressure to protect the turbocharger and engine components. When boost pressure reaches a predetermined value, the wastegate opens to provide a bypass for a portion of the exhaust gases which pass directly into the exhaust manifold.

Wastegates may include a mechanical valve or a solenoid actuated valve. In either case, failure of the valve may result in damage to the turbocharger or the engine. Valve failure may occur due to tampering in an attempt to achieve higher boost pressures. Wastegate failure due to tampering may result in turbo overspeed or turbo overboost which may cause excessive wear and damage to the turbocharger and engine components. Of course, other factors may also cause undesired turbo overspeed or turbo overboost regardless of whether the system utilizes single turbocharging or sequential turbocharging in which a plurality of turbochargers are arranged in sequence and selectively operated as desired.

SUMMARY OF THE INVENTION

It is therefore an object of the present invention to provide an improved system and method for controlling a turbocharger.

It is another object of the present invention to provide a system and method for controlling a turbocharger which protect the turbocharger from both turbo overspeed and turbo overboost.

In carrying out the above objects and other objects and features of the present invention, a system and method for controlling a turbocharger are provided. The method comprises establishing a turbocharger parameter limit value for a turbocharger parameter, such as turbine speed or turbo boost pressure, and monitoring the turbocharger parameter to determine a current value for the turbocharger parameter. A dynamic engine torque limit value is determined based on the current value of the turbocharger parameter and the turbocharger parameter limit value.

The dynamic engine torque limit value is compared to a provisional engine torque based on engine conditions. The applied engine torque is the lesser of the dynamic engine torque limit value and the provisional engine torque. The dynamic engine torque limits the applied engine torque to avoid damage which may be caused by excessive turbine speed or turbo boost pressure. In one embodiment, the dynamic engine torque limit value is determined such that when the applied engine torque is limited to the dynamic engine torque limit value, the turbocharger parameter is controlled about tracks to the turbocharger parameter limit value. Further, in one embodiment, the dynamic engine torque limit value is determined from a closed loop control system which compares the current value of the turbocharger parameter to the turbocharger parameter limit value.

In a preferred embodiment, determining the dynamic engine torque limit value comprises establishing a first engine torque sufficient to prevent engine stalling, and determining a second engine torque based on the current value of the turbocharger parameter and the turbocharger parameter limit value. The dynamic engine torque limit value is determined as the greater of the first and second engine torques to prevent engine stalling.

Further, in a preferred embodiment, a fault threshold value less than the turbocharger parameter limit value is established for the turbocharger parameter. A fault condition is determined when the turbocharger parameter exceeds the fault threshold value. When the fault condition exists, applied torque is limited to the lesser of the dynamic engine torque limit value and the provisional engine torque. Otherwise, the applied torque is the provisional engine torque.

A clear threshold value less than the fault threshold value is established for the turbocharger parameter to provide appropriate hysteresis. The fault condition is cleared when the turbocharger parameter falls below the clear threshold value.

Further, a method of controlling a turbocharger in a sequential turbocharging system including a plurality of turbochargers is provided. The plurality of turbochargers includes a primary turbocharger and at least one secondary turbocharger. The sequential turbocharging system is operable in a single turbo mode in which only the primary turbocharger is active, and a multiple turbo mode in which the primary turbocharger and at least one secondary turbocharger are active. The method comprises limiting the applied engine torque to the lesser of a dynamic engine torque limit value and a provisional engine torque. The dynamic engine torque limit value is determined based on the current value of the turbocharger parameter and the turbocharger parameter limit value.

The method of controlling a turbocharger in a sequential turbocharging system further comprises establishing a fault threshold value less than the turbocharger parameter limit value for the one or more turbocharger parameters. A fault condition is indicated when a turbocharger parameter exceeds the fault threshold value. When the fault condition exists, the sequential turbocharging system is operated in the multiple turbo mode. The fault threshold for forced multiple turbo mode may be less than another fault threshold for initiating applied engine torque limiting as described previously to provide two-stage turbocharger protection.

Further, a system for controlling a turbocharger is provided. The system includes a sensing device for monitoring the turbocharger, and control logic for determining the dynamic engine torque limit value, determining the provisional engine torque, and limiting the applied torque.

Further, a computer readable storage medium having information stored thereon representing instructions executable by a computer to control a vehicle having an internal combustion engine with a turbocharger is provided. The computer readable storage medium includes instructions for monitoring the turbocharger, determining a dynamic engine torque limit value, determining a provisional engine torque, and limiting the applied engine torque.

The advantages accruing to the present invention are numerous. For example, systems and methods of the present invention are capable of effectively limiting turbine speed and turbo boost pressure to protect the turbocharger and engine components from excessive wear and damage which may occur due to a plurality of conditions, such as a failed wastegate.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
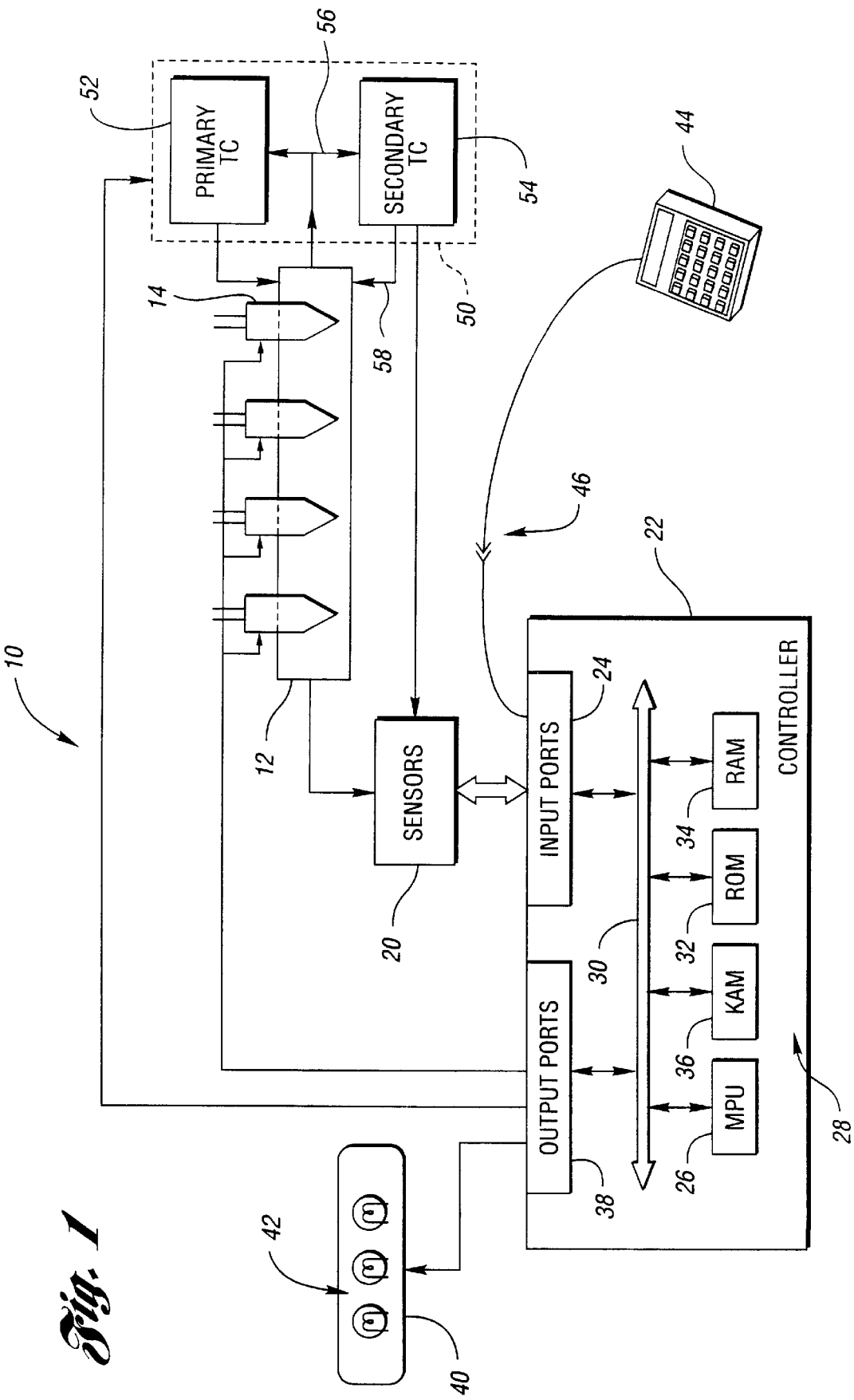
FIG. 1 is a schematic diagram of a turbocharger control system made in accordance with the present invention.

Referring now to FIG. 1, a system for controlling a turbocharger is shown. The system, generally indicated by reference numeral 10, includes an engine 12 having a plurality of cylinders, each fed by fuel injectors 14. In a preferred embodiment, engine 12 is a compression-ignition internal combustion engine, such as a four, six, eight, twelve, sixteen or twenty-four-cylinder diesel engine, or a diesel engine having any other desired number of cylinders. Fuel injectors 14 receive pressurized fuel from a supply connected to one or more high or low pressure pumps (not shown) as is well known in the art. Alternatively, embodiments of the present invention may employ a plurality of unit pumps (not shown), each pump supplying fuel to one of the injectors 14.

The system 10 includes a sequential turbocharging system 50 for drawing air into the cylinders to create increased power during combustion. Sequential turbocharging system 50 is a dual sequential turbocharging system which includes a primary turbocharger 52 and a secondary turbocharger 54. Engine exhaust is routed to the turbocharger turbine inlets along lines 56. Air drawn into the engine air intake is routed through the compressors and to the engine through air inlet lines 58. It is to be understood that the dual sequential turbocharging system is shown for purposes of illustration, and that systems and methods of the present invention may be employed in any multi-turbo sequential turbocharging system or single turbo turbocharging system.

The system 10 may also include various sensors 20 for generating signals indicative of corresponding operational conditions or parameters of engine 12, the vehicle transmission (not shown), turbocharging system 50, and other vehicular components. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as a read-only memory (ROM) 32, random access memory (RAM) 34, keep-alive memory (KAM) 36, and the like. The computer readable storage media may be implemented by any of a number of known physical devices capable of storing data representing instructions executable via a computer such as controller 22. Known devices may include, but are not limited to, PROM, EPROM, EEPROM, flash memory, and the like in addition to magnetic, optical, and combination media capable of temporary or permanent data storage.

Computer readable storage media 28 implement control logic via software, firmware, microcode, and/or circuitry to effect control of various systems and subsystems of the vehicle, such as engine 12, a vehicle transmission (not shown), turbocharging system 50, and the like. Controller 22 receives signals from sensors 20 via input ports 24 and generates output signals which may be provided to various actuators and/or components via output ports 38. Signals may also be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information there-between. Interface 44 may be used to change values within the computer readable storage media 28, such as configuration settings, calibration variables, fault threshold values, control logic, and the like.

In operation, controller 22 receives signals from sensors 20 and executes control logic to control one or more turbochargers by limiting engine torque to prevent excessive wear and damage to a turbocharger or other engine components due to, for example, turbo overspeeding or overboosting. In a preferred embodiment, controller 22 is the DDEC controller available from Detroit Diesel Corporation, Detroit, Mich. Various other features of this controller are described in detail in U.S. Pat. Nos. 5,477,827 and 5,445,128, the disclosures of which are hereby incorporated by reference in their entirety.

With continuing reference to FIG. 1, a logic controller, such as microprocessor 26, controls the signals sent to the fuel injectors 14. Microprocessor 26 computes a provisional or desired engine torque based on operator demand and current operating conditions. The provisional engine torque may be limited by a dynamic engine torque limit value to protect the turbocharger(s) according to the present invention. The signals sent to fuel injectors 14 are then based on the applied engine torque (after torque limiting when appropriate). In sequential turbocharger system 50, microprocessor 26 determines the turbocharger system mode of operation, such as single turbo or multiple-turbo mode. The dynamic torque limiting and turbo mode selection may be included in the functions of microprocessor 26, or may be implemented in any other manner known in the art of hardware and software control systems including an independent control unit which is in communication with controller 22 for turbocharger control.

As will be appreciated by one of ordinary skill in the art, the control logic may be implemented or effected in hardware, software, or a combination of hardware and software. The various functions are preferably effected by a programmed microprocessor, such as the DDEC controller, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine or transmission. Likewise, parallel processing or multi-tasking systems and methods may be used to accomplish the objects, features, and advantages of the present invention. The present invention is independent of the particular programming language, operating system, or processor used to implement the control logic illustrated.

Figure 2:
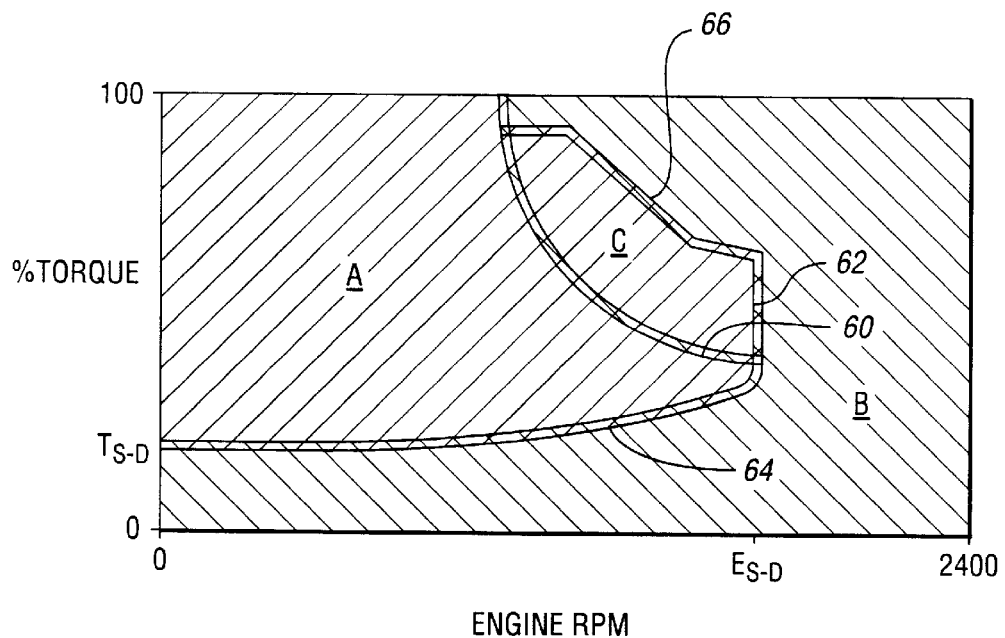
FIG. 2 is a graph depicting operating regions for a dual sequential turbocharging system of the present invention.

Referring to FIG. 2, the operating regions of the dual sequential turbocharging system 50 are illustrated. The system preferably operates in single turbo mode in region A and in region C, and in dual turbo mode in region B. The regions illustrated are representative only and may vary based on the particular application. In general, the regions are delineated based on percent engine torque and engine speed. The sequential turbocharger system 50 provides extra turbo boost at low engine speed and consequently better acceleration, particularly for marine applications. In addition to engine speed and percent torque, the turbo control strategy of a preferred embodiment uses the turbocharger shaft speed to determine whether to operate in single turbo mode or dual turbo mode. The operating regions and transitions therebetween will now be described in detail for the system illustrated.

During acceleration at low engine speeds, indicated in region A and in region C, the primary turbocharger 52 will be used to produce as much boost as possible without over-speeding the turbocharger. The secondary turbocharger 54 will be activated before the primary turbocharger 52 overspeeds by monitoring the first control parameter, turbine speed. A line of constant turbine speed is indicated at 60. The second control parameter is engine RPM. As engine RPM increases, the amount of air flow required by the engine increases, and the secondary turbocharger 54 is activated, in region B, to provide the increased air flow. An engine RPM limit at which a switch to dual turbo mode is forced, $E_{S-D}$, is indicated at 62. The third control parameter, applied engine torque (as a percentage of full or maximum engine torque at the current RPM), defines the upper and lower bounds of the single turbo mode regions A and C. The purpose of the lower bound, $T_{S-D}$, indicated at 64, is to prevent engine oil from pooling and leaking past the secondary turbo oil seal. The upper bound, indicated at 66, provides a transition to dual mode so as not to overspeed the turbo.

In addition, if the engine is in start mode or the engine is idling, turbo system 50 is preferably in dual turbo mode. Also, if the turbo speed sensor is not configured or if the turbo speed sensor has failed, then the turbo speed is preferably not used to determine transition points since turbo speed information is unavailable or may not be reliable. The transitions between turbo modes are summarized below.

Any one of the following conditions is sufficient to cause a transition to dual turbo mode from single mode:

a) the engine is in start mode;

b) the engine is idling;

c) the engine RPM is greater than a calibratable threshold (indicated at 62);

d) the turbo speed is greater than or equal to a calibratable threshold (indicated at 60), and the torque is greater than or equal to a calibratable torque as a function of engine RPM (indicated at 66); or e) the torque is less than a calibratable torque as a function of engine RPM indicating the low speed torque line (indicated at 64).

All of the following conditions are simultaneously required to cause a transition to single turbo mode from dual turbo mode:

a) the engine is not in start mode;

b) the engine is not idling;

c) the engine RPM is less than or equal to a calibratable threshold, preferably with hysteresis (indicated at 62);

d) the turbo speed is less than a calibratable threshold, preferably with hysteresis (indicated at 60), or the torque is less than a calibratable torque as a function of engine RPM, preferably with hysteresis (indicated at 66); and e) the torque is greater than or equal to a calibratable torque as a function of engine RPM, preferably with hysteresis, indicating the low speed torque line (indicated at 64).

In the conditional statements described previously, the statements which refer to turbo speed can be resolved if the sensor has failed or is unconfigured as follows. If the torque check in the same statement is enabled, then turbo speed is considered as above the threshold value, i.e. turbo speed is removed from the criteria. This will allow transitions based on torque, but not on turbo speed. If the torque check in the same statement is disabled, then the turbo speed is considered as below the threshold value.

In a preferred embodiment, particularly suitable for marine applications, the engine RPM ranges from about 0 to 2,400 RPM. The line of constant turbo speed, indicated at 60, has an upper threshold value of about 40,000 RPM, and a lower threshold value of about 35,000 RPM to provide hysteresis. The engine RPM limit, indicated at 62, has an upper threshold value of about 1,750 RPM, and a lower threshold value of about 1,700 RPM to provide hysteresis.

Further, in a preferred embodiment, the minimum torque limit, indicated at 64, has a timer to delay transitions from one mode to the other mode, in addition to parameter value hysteresis. The timer will prevent transitions when the applied torque changes significantly in one direction, and then changes back to its initial value within a short period of time. For example, when the engine is in single turbo mode, and a drop in torque demand occurs due to a slight deceleration or decrease in requested speed, then the engine returns to its previous torque demand, the engine remains in single turbo mode due to the timer delay. Preferably, all of the transition conditions have some time delay in addition to parameter hysteresis to prevent rapid oscillation between modes.

A variety of conditions may cause turbo overspeeding, or overboosting. For example, failure of the wastegate (possibly due to tampering), failure of exhaust flaps which are opened to enable additional turbochargers in a sequential turbocharging system, or other conditions may cause turbo overspeed or turbo overboost.

To protect a turbocharger from damage due to overspeeding, a turbo overspeed fault condition is indicated so that corrective action may be taken. Turbo overspeed occurs when the turbo speed exceeds an established active fault threshold value which is less than the turbo speed limit value. The turbo overspeed fault is cleared when the turbo speed falls below the active fault threshold value with hysteresis, or clear threshold value. When an active turbo overspeed fault exists, the check engine light is preferably energized to alert an operator of the fault condition. If the turbo speed sensor is not configured then turbo overspeed faults cannot be easily detected and logged. Similarly, if the turbo speed sensor fails, turbo overspeed conditions are not easily determinable and no overspeed faults will be logged. If an overspeed fault is in progress when the turbo speed becomes invalid, then the overspeed fault will be cleared.

When the turbo overspeed fault becomes active in a dual turbocharger system, whether in single or dual turbo mode, the turbo system is forced into dual turbo mode. The system remains in dual turbo mode for a minimum calibratable time to allow the system to complete its transition to dual turbo mode. The mode may change only after the minimum time has expired, and the turbo overspeed fault has cleared at which point the turbo system operates normally.

Figure 3:
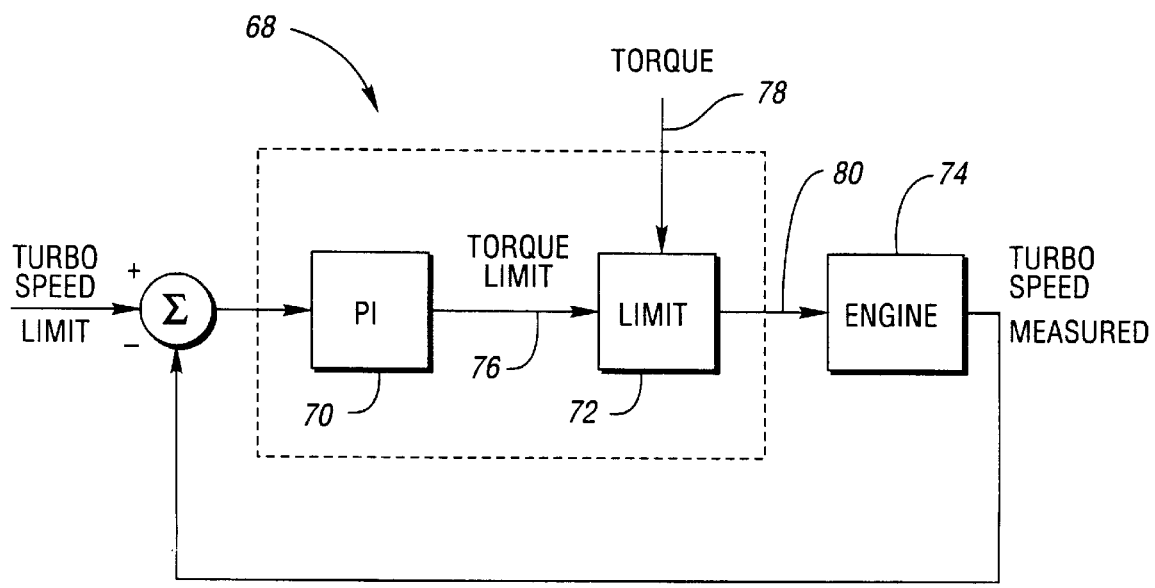
FIG. 3 is a block diagram of a closed loop control system of the present invention which determines the dynamic engine torque limit value based on turbine speed.

With reference to FIG. 3, a dynamic engine torque limit value is provided to protect the turbocharger during an overspeed condition. The torque limit is determined preferably based on a closed loop control system, generally indicated at 68. The closed loop control system 68 preferably includes a proportional/integral term 70, although other types of controllers may be used. The control system 68 includes torque limiting logic 72, which limits the torque applied to engine 74 by selecting or passing the lower of its input torques to its output which then becomes the applied engine torque.

The closed loop controller 68 preferably becomes enabled when the turbo speed reaches the overspeed active fault threshold value, causing an overspeed fault condition. The controller provides control of turbine speed through torque limiting of the engine. The dynamic torque limit is based on the difference (or error) between the established turbocharger speed limit value and the current turbine speed. The turbocharger parameter limit value is chosen to be greater than the overspeed active fault threshold value to allow the system to provide a controlled response and protect the turbo system.

The controller remains enabled until the measured turbo speed falls below the turbo overspeed clear threshold value, and the overspeed fault has cleared. At this time, the controller 68 ceases to provide a torque limit. The torque limit provided by the turbo overspeed protection should not be lower than an engine torque sufficient to prevent the engine from stalling.

When control system 68 is enabled, and the provisional torque 78 is greater than dynamic torque limit 76, the applied torque 80 effectively becomes the dynamic torque limit 76. As the turbine speed approaches its established limit value due to torque demand exceeding the dynamic torque limit, the error is reduced, resulting in a reduction of the dynamic torque limit 76. This effectively reduces engine torque to reduce exhaust flow through the turbine so that the turbocharger doesn't overspeed. When the provisional torque 78 is less than torque limit 76, the applied torque 80 is the provisional torque 78, allowing the engine to run without torque limiting while control system 68 remains enabled.

To protect the turbocharger from damage due to overboosting, a turbo overboost fault condition is indicated so that corrective action may be taken. Turbo overboost occurs when the turbo boost pressure exceeds an established active fault threshold value which is less than the turbo boost pressure limit value. The turbo overboost fault is cleared when the turbo boost pressure falls below the active fault threshold value with hysteresis, or clear threshold value. When an active turbo overboost fault exists, the check engine light should be turned on to alert an operator of the fault condition. If the turbo boost pressure sensor is not configured then turbo overboost faults cannot be easily detected and logged. Similarly, if the turbo boost pressure sensor fails then turbo overboost conditions are not easily determinable and no overboost faults will be logged. If an overboost fault is in progress when the turbo boost pressure becomes invalid, then the overboost fault will be cleared.

When the turbo overboost fault becomes active in a dual turbocharger system, whether in single or dual turbo mode, the turbo system is forced into dual turbo mode. The system will remain in dual turbo mode for a minimum calibratable time to allow the system to complete its transition to dual turbo mode. The system mode will be allowed to change after the minimum time has expired, and the turbo overboost fault has cleared, at which point the turbo system will operate normally.

Figure 4:
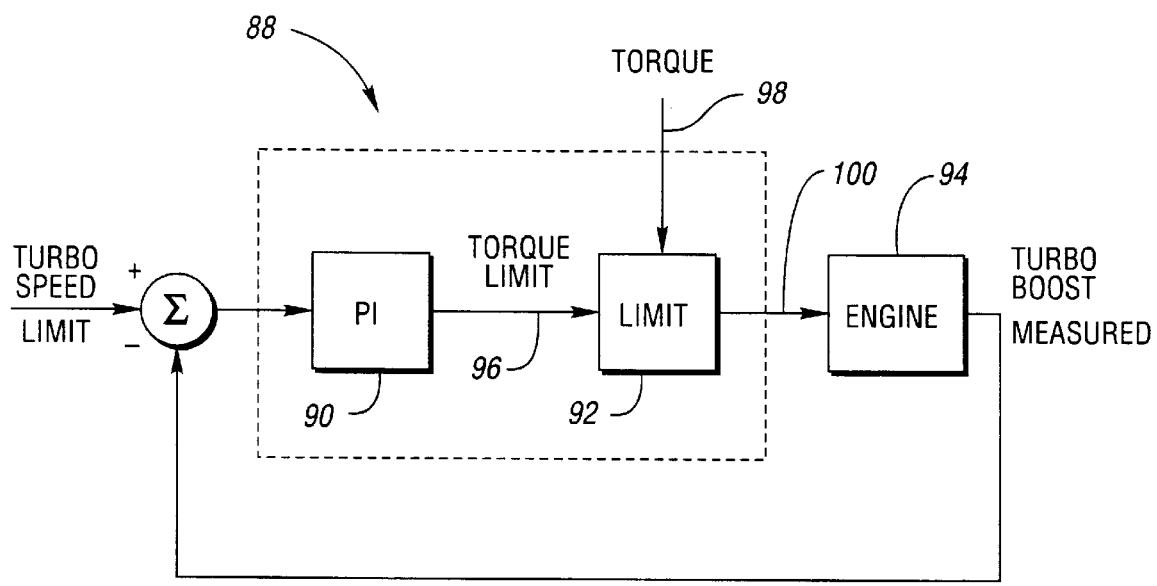
FIG. 4 is a block diagram of a closed loop control system of the present invention which determines the dynamic engine torque limit value based on turbo boost pressure.

With reference to FIG. 4, a dynamic engine torque limit value is provided to protect the turbocharger during an overboost condition. The torque limit is determined preferably based on a closed loop control system, generally indicated at 88. The closed loop control system 88 preferably includes a proportional/integral term 90, although other types of controllers may be used. The control system 88 includes torque limiting logic 92, which limits the torque applied to engine 94 by selecting or passing the lower of its input torques to its output which then becomes the applied engine torque.

The closed loop controller 88 preferably becomes enabled when the turbo boost pressure reaches the overboost active fault threshold value, causing an overboost fault condition. The controller provides control of turbo boost pressure through torque limiting of the engine. The dynamic torque limit is based on the difference (or error) between the established turbo boost pressure limit value and the current turbo boost pressure. The turbocharger parameter limit value is chosen to be greater than the overboost active fault threshold value to allow the system to provide a controlled response and protect the turbo system.

The controller remains enabled until the measured turbo boost pressure falls below the turbo overboost clear threshold value, and the overboost fault has cleared. At this time, the controller 88 ceases providing a torque limit. The torque limit provided by the turbo overboost protection is preferably at least sufficient to prevent the engine from stalling.

When control system 88 is enabled, and the provisional torque 98 is greater than dynamic torque limit 96, the applied torque 100 effectively becomes the dynamic torque limit 96. As the turbo boost pressure approaches its established limit value due to torque demand exceeding the dynamic torque limit, the error is reduced, resulting in a reduction of the dynamic torque limit 96. This effectively reduces engine torque to reduce exhaust flow through the turbine so that the turbocharger doesn't overboost. When the provisional torque 98 is less than torque limit 96, the applied torque 80 is the provisional torque 98, allowing the engine to run without torque limiting while control system 88 remains enabled.

In the previously described closed loop control systems for overspeed and overboost turbo protection, representative gain values are as follows. For a turbo speed monitoring system, a proportional gain of about 0.008% Torque/RPM, and an integral gain of about 0.008% Torque * s/RPM may be used where % Torque represents the output demanded of the engine and RPM is turbine RPM. For a turbo boost pressure monitoring system, a proportional gain of about 0.7% Torque/kPa, and an integral gain of about 0.7% Torque * s/kPa may be used. Of course, these values will vary based on the particular application and the desired response characteristics of the closed loop controller during dynamic torque limiting.

It is to be understood that systems and methods of the present invention may control and limit turbo speed, turbo boost pressure, and/or any other turbocharger parameter using a dynamic torque limit based on the current value of the turbocharger parameter and a turbocharger parameter limit value. The systems and methods are preferably implemented using closed loop control to limit engine torque based on an error signal between the current turbocharger parameter measured value and the established limit value.

Figure 5:
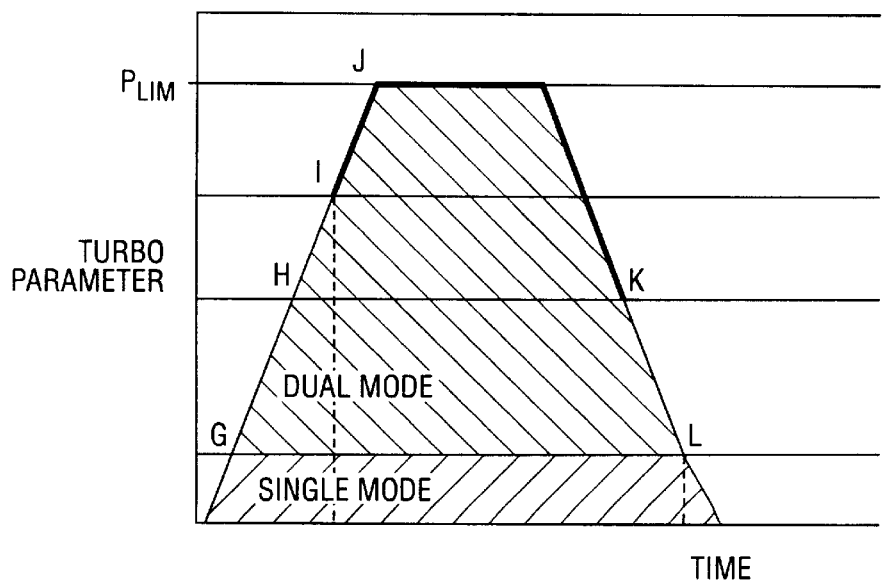
FIG. 5 is a graph depicting operation of a dual sequential turbocharger system with the torque limiting of the present invention.

Referring now to FIG. 5, operation of a dual sequential turbocharger in accordance with the present invention is illustrated. A turbo parameter selected from the group consisting of turbo speed or turbo boost pressure or any other suitable parameter is indicated on the ordinate. Time is indicated on the abscissa. At point G, the turbo parameter exceeds an established operating threshold value at which transition to dual turbo mode is desired. At point H, the turbocharger parameter exceeds an inactive fault threshold value, causing the system to force dual turbo mode as described previously. At point I, the turbo parameter exceeds an established active fault threshold value, causing dynamic torque limiting of the present invention to be enabled.

While dynamic torque limiting is enabled, the applied engine torque substantially is limited by the dynamic engine torque limit value. Otherwise, the applied engine torque is the provisional engine torque. It is to be understood that the dynamic torque limiting may always be enabled if desired, since the determined dynamic torque limit value will always be very large (due to the large error signal) unless the measured turbocharger parameter is near the established limit value.

At point J, due to provisional torque exceeding the dynamic torque limit value, the turbo parameter is substantially limited by the turbocharger parameter limit value in a manner determined by the type of controller, any associated gain values, and engine conditions. It is to be appreciated that design criteria such as maximum overshoot, rise-time, settling time, and other criteria may be met by proper tuning of the PI controller and/or by including additional control elements in the system such as derivative control or lead/lag compensators.

At point K, the turbo parameter has proceeded below the clear threshold, clearing the active fault, and disabling the dynamic torque limiting. At point L, the inactive fault is cleared, allowing transition back to single turbo mode. It is to be understood that the systems and methods of the present invention may be applied to a single turbo to protect the turbo by limiting engine torque, or to multiple turbos in any type of multiple turbo system.

Figure 6:
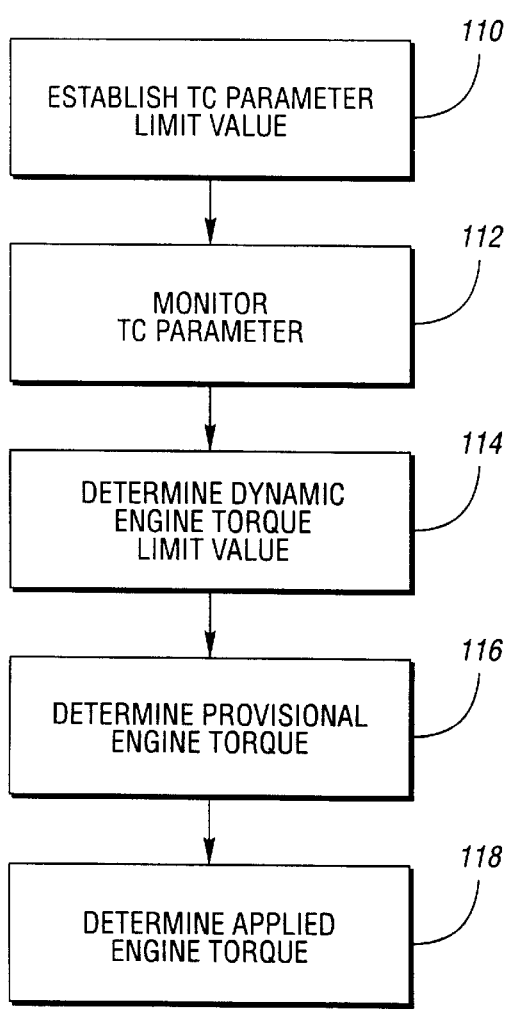
FIG. 6 is a block diagram illustrating a method of the present invention for controlling a turbocharger.

With reference now to FIG. 6, a method of the present invention will be described. At step 110, a turbocharger parameter limit value is established for a turbocharger parameter preferably selected from the group consisting of turbine speed and turbo boost pressure. At step 112, the turbocharger parameter is monitored with appropriate sensors for measuring the turbocharger parameter. At step 114, a dynamic engine torque limit value is determined based on the current value of the turbocharger parameter and the turbocharger parameter limit value. The dynamic engine torque limit value is preferably determined from a closed loop control system of the type including negative feedback to compare the current turbocharger parameter value to the turbocharger parameter limit value.

At step 116, a provisional engine torque is determined based on engine conditions. Alternatively, fuel per cycle or percent load could be used for the purposes of system control instead of engine governing torque. At step 118, the dynamic engine torque limit value is compared to the provisional engine torque, and the applied engine torque is limited to the lesser of the two torques.

In a preferred embodiment, a first engine torque limit sufficient to prevent engine stalling is established. A second engine torque is determined based on the closed loop control system. The dynamic engine torque limit value of step 114 is determined as the greater of these first and second torque values.

Figure 7:
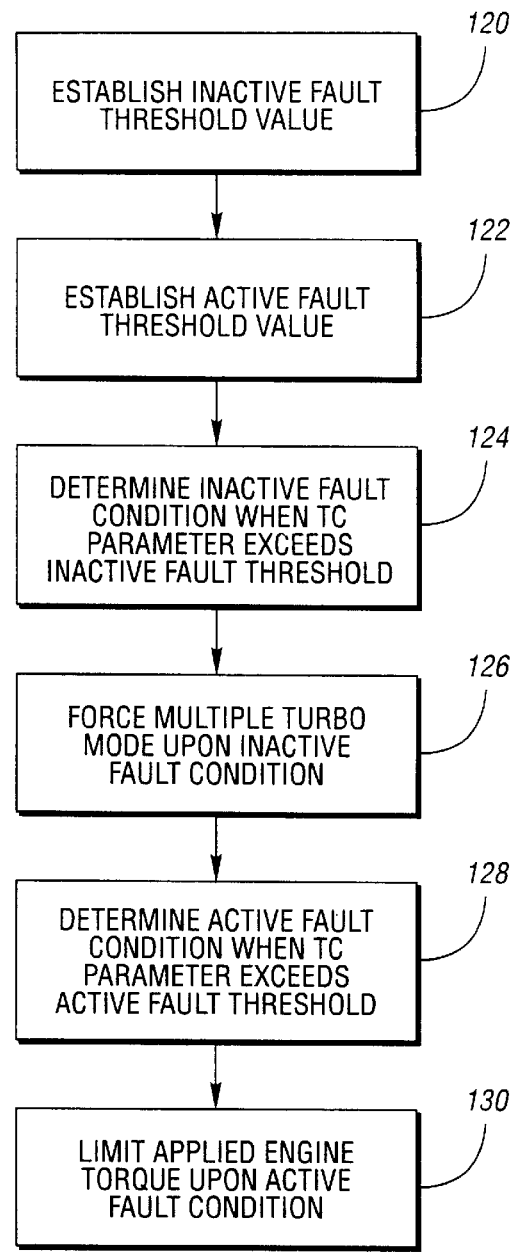
FIG. 7 is a block diagram illustrating a method of the present invention for controlling a turbocharger in a sequential turbocharging system.

With reference to FIG. 7, another method of the present invention will be described. At step 120, an inactive fault threshold value is established for forcing multiple turbo mode in a multiple turbocharger system. The inactive fault threshold value is less than the turbocharger parameter limit value. At step 122, an active fault threshold value is established for enabling the dynamic torque limiting of the present invention. The active fault threshold value is less than the turbocharger parameter limit value, and greater than the inactive fault threshold value.

At step 124, an inactive fault condition is determined when the turbocharger parameter exceeds the inactive fault threshold value. At step 126, upon determination of the inactive fault condition, the turbocharging system is forced into multi-turbo mode, or dual-mode in a dual sequential turbocharging system.

At step 128, an active fault condition is determined when the turbocharger parameter exceeds the active fault threshold value. At step 130, upon determination of the active fault condition, applied engine torque is limited according to the dynamic engine torque limit value, and is preferably subjected to a minimum torque to prevent engine stalling.

It is to be appreciated that the present invention achieves precise control over one or more turbocharger parameters, such as turbine speed and turbo boost pressure. Systems and methods of the present invention are applicable to any type of turbocharging system including single turbo and multiple turbo systems, and provide control over turbocharger parameters by utilizing a dynamic torque limit.

While the best mode contemplated for carrying out the invention has been described in detail, those familiar with the art to which this invention relates will recognize various alternative designs and embodiments for practicing the invention as defined by the following claims.

What is claimed is:

1. A method of controlling a turbocharger to limit a turbocharger parameter to a desired limit value in an internal combustion engine, the method comprising:

monitoring the turbocharger to determine a current value for the turbocharger parameter;

determining a dynamic engine torque limit value based on the current value of the turbocharger parameter and the turbocharger parameter limit value; and limiting an applied engine torque to the dynamic engine torque limit value to limit the turbocharger parameter.

2. The method of claim 1 wherein the dynamic engine torque limit value is determined such that when the applied engine torque is limited to the dynamic engine torque limit value, the current value of the turbocharger parameter is substantially limited by the turbocharger parameter limit value.

3. The method of claim 2 wherein the dynamic engine torque limit value is determined from a closed loop control system which compares the current value of the turbocharger parameter to the turbocharger parameter limit value.

4. The method of claim 1 wherein the turbocharger parameter is selected from the group consisting of turbine speed and turbo boost pressure.

5. The method of claim 1 wherein determining a dynamic engine torque limit value comprises:

establishing a first engine torque sufficient to prevent engine stalling;

determining a second engine torque based on the current value of the turbocharger parameter and the turbocharger parameter limit value; and determining the dynamic engine torque limit value as the greater of the first engine torque and the second engine torque.

6. The method of claim 1 wherein limiting an applied engine torque comprises:

establishing a fault threshold value for the turbocharger parameter, the fault threshold value being less than the turbocharger parameter limit value;

determining a fault condition when the turbocharger parameter exceeds the fault threshold value; and limiting the applied engine torque to the lesser of the dynamic engine torque limit value and the provisional engine torque when the fault condition exists.

7. The method of claim 6 further comprising:

establishing a clear threshold value for the turbocharger parameter, the clear threshold value being less than the fault threshold value; and clearing the fault condition when the turbocharger parameter falls below the clear threshold value.

8. A method of controlling a turbocharger to limit a turbocharger parameter to a desired limit value in a sequential turbocharging system including a plurality of turbochargers, the method comprising:

monitoring the turbocharger to determine a current value for the turbocharger parameter;

determining a dynamic engine torque limit value based on the current value of the turbocharger parameter and the turbocharger parameter limit value; and limiting an applied engine torque to the dynamic engine torque limit value to limit the turbocharger parameter.

9. The method of claim 8 wherein the dynamic engine torque limit value is determined such that when the applied engine torque is limited to the dynamic engine torque limit value, the current value of the turbocharger parameter is substantially limited by the turbocharger parameter limit value.

10. The method of claim 9 wherein the dynamic engine torque limit value is determined from a closed loop control system which compares the current value of the turbocharger parameter to the turbocharger parameter limit value.

11. The method of claim 8 wherein the turbocharger parameter is selected from the group consisting of turbine speed and turbo boost pressure.

12. The method of claim 8 wherein determining a dynamic engine torque limit value comprises:

establishing a first engine torque sufficient to prevent engine stalling;

determining a second engine torque based on the current value of the turbocharger parameter and the turbocharger parameter limit value; and determining the dynamic engine torque limit value as the greater of the first engine torque and the second engine torque.

13. The method of claim 8 wherein selecting an applied engine torque comprises:

establishing a fault threshold value for the turbocharger parameter, the fault threshold value being less than the turbocharger parameter limit value;

determining a fault condition when the turbocharger parameter exceeds the fault threshold value; and limiting the applied engine torque to the lesser of the dynamic engine torque limit value and the provisional engine torque when the fault condition exists.

14. The method of claim 13 further comprising:

establishing a clear threshold value for the turbocharger parameter, the clear threshold value being less than the fault threshold value; and clearing the fault condition when the turbocharger parameter falls below the clear threshold value.

15. The method of claim 8 wherein the plurality of turbochargers includes a primary turbocharger and at least one secondary turbocharger, the sequential turbocharging system being operable in a single turbo mode in which only the primary turbocharger is active, and a multiple turbo mode in which the primary turbocharger and at least one secondary turbocharger are active, the method further comprising:

establishing a fault threshold value for the turbocharger parameter, the fault threshold value being less than the turbocharger parameter limit value;

determining a fault condition when the turbocharger parameter exceeds the fault threshold value; and operating the sequential turbocharging system in the multiple turbo mode when the fault condition exists.

16. A system for controlling a turbocharger in an internal combustion engine, the system comprising:

a sensing device for monitoring the turbocharger to determine a current value for a turbocharger parameter;

control logic for determining a dynamic engine torque limit value based on the current value of the turbocharger parameter and an established turbocharger parameter limit value, determining a provisional engine torque, and limiting an applied engine torque to the lesser of the dynamic engine torque limit value and the provisional engine torque.

17. The system of claim 16 wherein the control logic determines the dynamic engine torque limit value such that when the applied engine torque is limited to the dynamic engine torque limit value, the current value of the turbocharger parameter is substantially limited by the turbocharger parameter limit value.

18. The system of claim 17 wherein the control logic determines the dynamic engine torque limit value from a closed loop control system which compares the current value of the turbocharger parameter to the turbocharger parameter limit value.

19. A computer readable storage medium having information stored thereon representing instructions executable by a computer to control a vehicle having an internal combustion engine with a turbocharger, the computer readable storage medium comprising:

instructions for monitoring the turbocharger to determine a current value for a turbocharger parameter;

instructions for determining a dynamic engine torque limit value based on the current value of the turbocharger parameter and an established turbocharger parameter limit value;

instructions for determining a provisional engine torque; and instructions for limiting an applied engine torque to the lesser of the dynamic engine torque limit value and the provisional engine torque.

20. The computer readable storage medium of claim 19 further comprising:

instructions for determining the dynamic engine torque limit value such that when the applied engine torque is limited to the dynamic engine torque limit value, the turbocharger parameter substantially tracks to the turbocharger parameter limit value.

* * * * *